June 3, 1958 D. F. ALBANESE 2,837,719

PULSE MODULATOR

Filed Dec. 5, 1956 3 Sheets-Sheet 1

Inventor
DAMIAN F. ALBANESE
By Alfred C. Hill
Agent

June 3, 1958 D. F. ALBANESE 2,837,719

PULSE MODULATOR

Filed Dec. 5, 1956 3 Sheets-Sheet 2

Inventor
DAMIAN F. ALBANESE

By Alfred C. Hill
Agent

PULSE MODULATOR

Filed Dec. 5, 1956 3 Sheets-Sheet 3

Inventor
DAMIAN F. ALBANESE
By Alfred C. Hill
Agent

Patented June 3, 1958

2,837,719

PULSE MODULATOR

Damian F. Albanese, Irvington, N. J., assignor to International Telephone and Telegraph Corporation, Nutley, N. J., a corporation of Maryland Application December 5, 1956, Serial No. 626,411

7 Claims. (Cl. 332—9)

This invention relates to pulse modulators and more particularly to a differential modulator.

In differential modulation, the modulator in response to a positive or negative change in the magnitude of the modulating signal produces discrete signals representing the direction of change. These discrete signals may be in the forms of positive or negative pulses. Where there is no change in certain systems alternate positive and negative pulses are generated, while in other systems no pulses are generated. Various modulators of this general type have been described in the literature. Many of such modulators are relatively complex since they require reconstitution from the generated pulses of a replica of the original signal wave and comparison between this replica and the original signal wave. Such comparison arrangements are obviously relatively complex.

An object of this invention is to provide an improved modulator of the general type above described.

A feature of this improved modulator is that it does not use such comparison means.

Another feature of the improved modulator is its relative simplicity.

A further feature of this invention is the provision of a differential modulator employing a simple arrangement of a conventional pulse time modulator and a short-circuited delay line.

A more specific feature of this invention is the provision of a differential modulator including a pulse position modulator coupled to the output of a modulating source to produce position modulated pulses in accordance with the signals of said modulating source. The output of the position modulator is coupled to a short-circuited delay line having a time delay equal to a predetermined time delay so that the reflected component of one position modulated pulse will be received at the sending end of the delay line when the next position modulated pulse is incident on the sending end of the delay line. The combination of these two pulses at the sending end of the delay line produces a resultant pulse signal from which the desired differential modulation is derived. A properly timed bi-polar switch may be employed to remove the differential modulation from said resultant pulse signal.

Figure 1A:
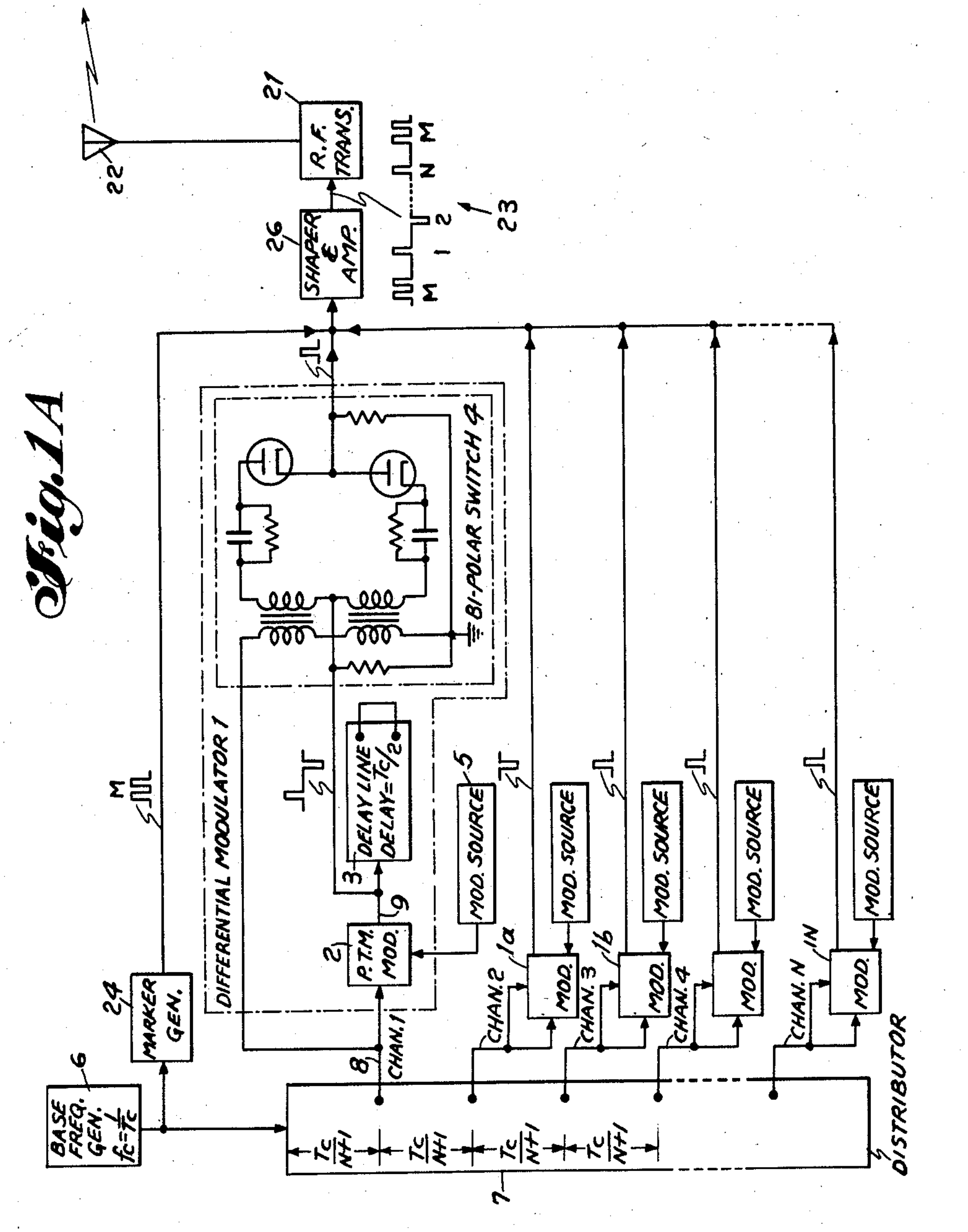
Figure 1B:
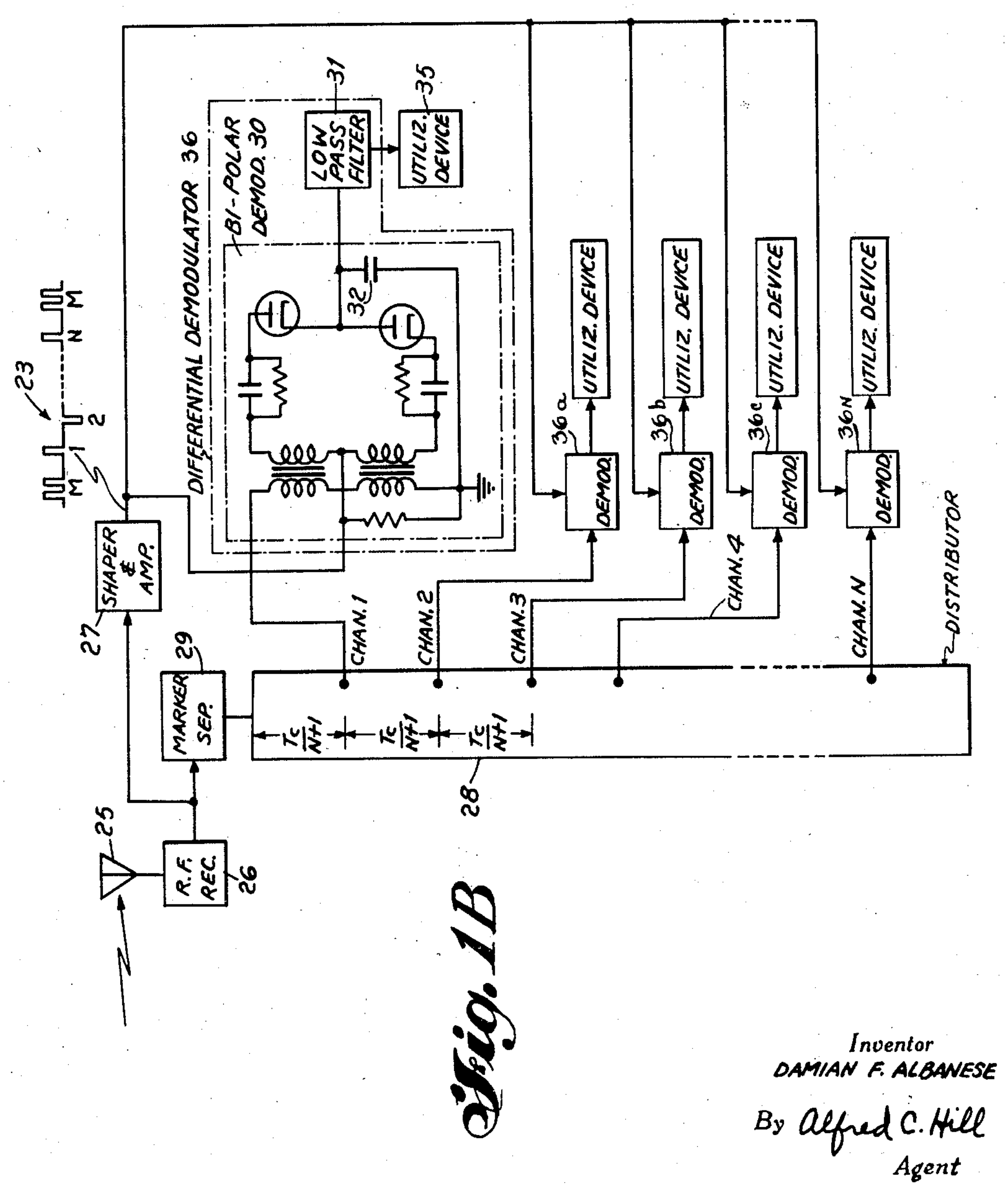
Figure 2:
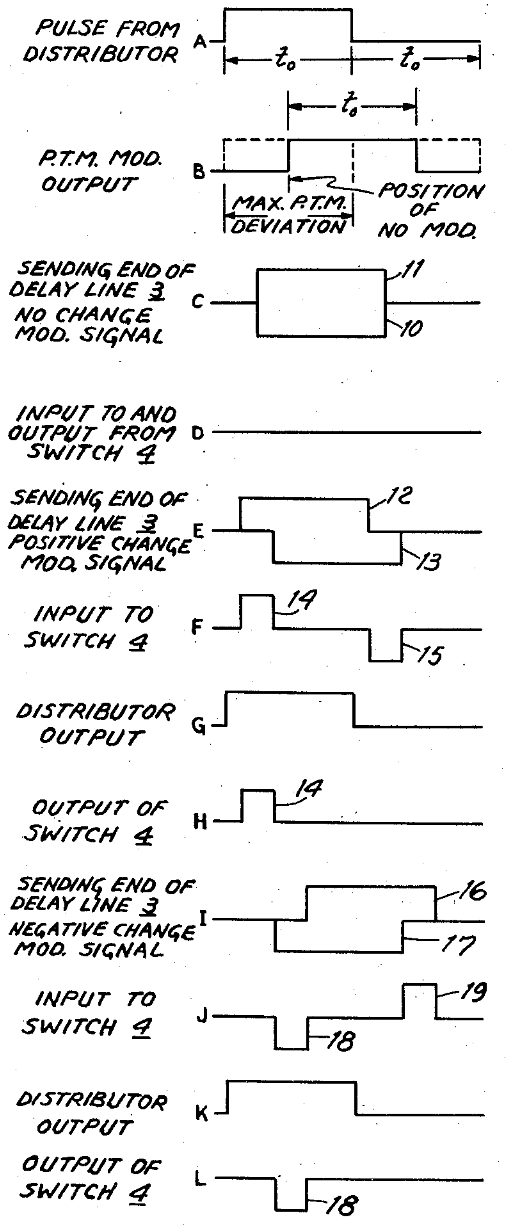
Figure 3:
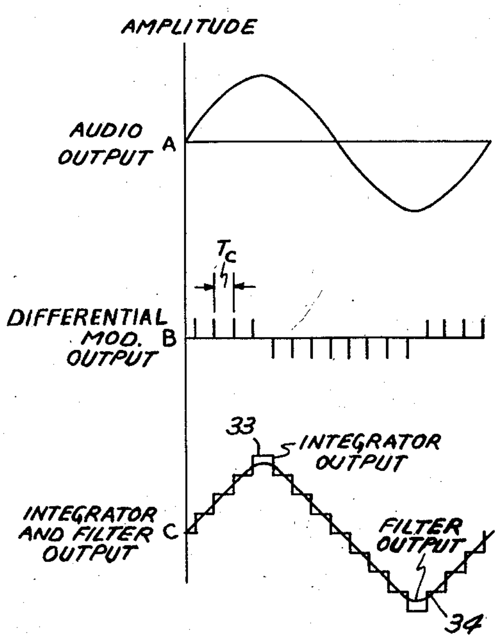

The above-mentioned and other features and objects of this invention will become more apparent by reference to the following description taken in conjunction with the accompanying drawings, in which:

Figs. 1A and 1B, respectively, is a schematic and block diagram of multiplex and demultiplex portion of a multichannel time multiplex pulse communication system employing the differential modulator of this invention;

Fig. 2 is a series of curves used in explaining the operation of the modulator of this invention; and Fig. 3 is a series of curves illustrating the combined operation of the modulator and demodulator employed in the system of Fig. 1.

Referring to Fig. 1A the differential modulator 1 of this invention is illustrated as comprising a pulse time modulation (PTM) modulator 2 and delay line 3 having its sending end coupled to modulator 2 and its receiving end short-circuited. A bi-polar switch 4 is coupled to the sending end of delay line 3 to extract differential modulation from a resultant signal produced at the sending end of delay line 3.

As pointed out hereinabove, the differential modulator must be able to recognize a positive or negative change in the magnitude of the modulating signal occurring during a sampling period. In the modulator of this invention this information in indicated as follows. If there is a positive change in the modulating signal, a positive pulse is generated; if there is no change, no pulse is generated; and if there is a negative change, a negative pulse is generated.

The modulator of this invention operates as follows. The modulating signal of source 5 is coupled to the PTM modulator 2 which has coupled thereto the sampling rate pulse coupled from a base frequency generator 6 and appropriately timed by distributor 7. The sampling pulse from tap 8 of distributor 7 has a width equal to the maximum PTM deviation as illustrated in curve A, Fig. 2. The rate of this sampling pulse is determined by the so-called quantizing noise which is permissible at the demodulator end of the system. The PTM modulated pulse is coupled by means of conductor 9 to the sending end of delay line 3 and has a characteristic substantially as illustrated in curve B, Fig. 2. Curve B, Fig. 2, illustrates that the PTM modulator output is a pulse at least $t_0$ wide and has a maximum deviation coextensive with the width of the sampling pulse of curve A with the unmodulated position of its leading edge disposed intermediate the extremities of the pulse of curve A.

The PTM pulse repetitious at the base frequency of generator 6 is impressed on the sending end of a short-circuited delay line 3. Delay line 3 has a time delay equal to one half the sampling period of the PTM pulses. Therefore, when a positive pulse is impressed on the sending end of delay line 3, it will be reflected from the short-circuited or receiving end of the line as a negative pulse and will arrive back at the sending end of delay line 3 at a time equal to the sampling period of the PTM modulator. In other words, the reflected component of one PTM pulse will be received at the sending end of a delay line at substantially the same time the next PTM pulse is impressed upon the sending end of delay line 3. To illustrate the operation of the differential modulator, it will be assumed that the more positive the modulating signal, the earlier the PTM will occur with respect to the unmodulated position. Let us now consider what happens at the sending end of delay line 3 under the following conditions between two consecutive PTM pulses. Condition A is no change in amplitude of the modulating signal, condition B is a positive change in amplitude of the modulating signal and condition C is a negative change in the amplitude of the modulating signal.

Under condition A, there will be no change in amplitude of the modulating signal and, therefore, two consecutive pulses will have the same displacement from the position of no modulation. This is illustrated in curve C, Fig. 2, where the negative pulse 10 is the reflected component of the preceding pulse arriving at the sending end of delay line 3 at the same instant as the next pulse, pulse 11, is impressed upon the sending end of delay line 3. This condition means that these two successive pulses are exactly spaced $T_c$ microseconds apart, where $T_c$ is equal to the repetition rate of the base frequency signal coupled from generator 6. Therefore, a first pulse will travel down delay line 3 and come back to the sending end of delay line 3 as a negative pulse 10, $T_c$ microseconds later. At exactly the same time, the next succeeding pulse will arrive at the sending end of delay line 3 and the two pulses will cancel. Therefore, if there is no change in the amplitude of the modulating signal between two consecutive sampling pulses, no pulse will appear at the input to bi-polar switch 4 and no pulse will appear at the output of switch 4. This is illustrated in curve D, Fig. 2.

Now consider condition B where there has been a positive change in magnitude of the modulating signal between two consecutive pulses. This means that the second pulse will occur earlier in time, with respect to the unmodulated position, than the preceding pulse. Therefore, there will be less than $T_c$ microseconds between the two pulses. At the sending end of delay line 3 the second pulse, pulse 12, will arrive earlier in time than the reflected previous pulse, pulse 13, as illustrated in curve E, Fig. 2. Note that this positive change in modulating signal produces a positive pulse 14 followed by a negative pulse 15 due to the combining of pulses 12 and 13, curve E. This resultant pulse signal at the sending end of delay line 3 is illustrated in curve F as the input applied to bi-polar switch 4. Bi-polar switch 4 also has applied thereto the output of tap 8 of distributor 7. This repetitious gate pulse, timed substantially as indicated in curve G, Fig. 2, acts to select the wanted pulse 14 and reject the unwanted pulse 15. Thus, pulse 14, curve H, appears at the output of switch 4 and is the desired modulation pulse. Details of the operation of bi-polar switch 4 are disclosed in the MIT Radiation Laboratories Series, volume 19, page 371.

Now let us consider condition C, where a negative change in the modulating signal has occurred between two consecutive pulses. This means that the second pulse, pulse 16, of curve I, Fig. 2 will occur later in time with respect to the unmodulated position than the reflected component of the preceding pulse, pulse 17, of curve I, Fig. 2. Therefore, there will be more than $T_c$ microseconds between the two pulses, which results in a wave shape substantially as illustrated in curve J, Fig. 2, wherein the differential modulation component, pulse 18, of the resultant signal is illustrated. This resultant modulation is coupled to switch 4 which again is acted upon by the gate pulse from tap 8 of distributor 7 to select only the wanted differential modulation component and disregarding the unwanted component, pulse 19 of the resultant signal of curve J, Fig. 2. Thus through the action of PTM modulator 2, delay line 3 and the bi-polar switch 4, there is derived a differential modulation signal representative of the signal of modulating source 5. Switch 4 operating as described in the aforementioned MIT Series, volume 19, on both polarities of the wanted component of the resultant signal at the sending end of delay line 3 to produce differential modulation.

Thus, the output of switch 4 during a sampling period is either a positive pulse indicating a positive change in the magnitude of the modulating signal, a negative pulse indicating a negative change in the magnitude of the modulating signal or no pulse indicating no change in the magnitude of the modulating signal.

There are several differences in the resulting differential modulator described immediately above and the prior art differential modulators. In most prior art differential modulators, the resulting pulses occur at a fixed time position, that is the spacing between the generated pulses is always the same. In the modulator herein described, the pulse position may vary by the amount that the pulse is deviated in PTM modulator 2. However, if the deviation is small compared to the repetition or sampling period, this will not introduce serious distortion. Another difference is that in certain prior art differential modulators, when there is no change in the magnitude of the modulating signal this results in a sequence of positive and negative pulses. However, the resulting average value is zero. In the modulator herein described, if there is no change in the magnitude of the modulating signal, no pulses are generated. The effect is substantially the same for both arrangements as far as the demodulator output is concerned.

Fig. 3 of the drawing illustrates in curve B the delta modulated output of switch 4 when the modulating signal takes the shape of a sine wave as illustrated in curve A. This single channel signal would then be coupled from the output of switch 4 to the common circuitry of a radio frequency transmitter substantially as illustrated in Fig. 1A by shaper amplifier 20 and radio frequency transmitter 21 applying the radio frequency modulated output to the antenna 22 for radiation therefrom to a receiving antenna.

The preceding description of modulator 1 applies to the other differential modulators illustrated in Fig. 1A identified as differential modulators 1a, 1b and 1n. The arrangement illustrated is a multichannel time multiplexed communication system employing the differential modulator of this invention. The time position of the output of each of the modulators 1 would be controlled by base frequency generator 6 establishing the sampling period and the distributor 7 having a plurality of time spaced taps therealong such that the outputs from the modulators 1 applied to the common circuitry 20 and 21 would be in time sequence substantially as illustrated in curve 23. The marker pulse of curve 23 is produced by applying the output of base frequency generator 6 to a marker generator 24 which produces the synchronizing signal for the pulse train of curve 23. In the example employed herein the synchronizing signal is illustrated as being a double pulse type synchronizing signal. However, it is to be understood that the synchronizing signal may be any other desired type having a characteristic different than the characteristic of the channel signals to enable the detection thereof at the receiving end of the system to time the demodulation operation occurring therein.

The pulse train radiated from antenna 22 of Fig. 1A in the form of a radio frequency wave is received by antenna 25 of the receiving terminal illustrated in Fig. 1B. The received signal is coupled to R. F. receiver 26 for recovery of the pulse train 23 which is in turn applied to shaper amplifier 27 to reshape the pulses of the received pulse train. The output of shaper 27 is then coupled to each one of the channel demodulators 36 to 36N wherein the respective channel signals are separated from the pulse train by action of the gate pulses coupled to the respective demodulators 36 to 36N from the time spaced taps disposed along distributor 28. The repetition rate of the gate pulses coupled from the distributor taps is controlled by the synchronizing signal M detected in marker separator 29 and coupled to distributor 28.

The differential demodulator may take the form illustrated in the differential demodulator 36 of channel #1 and includes a bi-polar demodulator 30 and a low-pass filter 31. The bi-polar demodulator 30 is substantially the same type of circuit as illustrated for the switch 4 of Fig. 1A and has the characteristic of being responsive to either positive or negative pulses occurring in the time interval of the gate or separator pulse applied from the channel tap of distributor 28. The condenser 32 employed in the bi-polar demodulator 30 is an integrating device and produces at the output of the bi-polar demodulator 30 a stepped or integrated waveform substantially as illustrated in curve C, Fig. 3 by waveform 33. This integrated or stepped waveform results from the integration of the differential modulation substantially as illustrated in curve B, Fig. 3. The integrated output of demodulator 30 is coupled to low-pass filter 31 wherein the integrated waveform is smoothed substantially as illustrated in curve 34 of curve C, Fig. 3. The resultant output of filter 31 has a waveform substantially identical with the original modulation as shown in curve A, Fig. 3. This output is coupled to device 35 to utilize the intelligence transmitted.

Details of the demodulator 30 may be found in the aforementioned MIT Series, volume 19 on page 371 in conjunction with the teachings found on page 519. On page 519 of the aforementioned MIT Series, volume 19, a more complicated bipolar demodulator is illustrated which would function as the demodulator of this system but it will be recognized that the simple form illustrated herein, having the same operation as switch 4, Fig. 1A, is of a simpler configuration and produces substantially the same end result.

While I have described above the principles of my invention in connection with specific apparatus, it is to be clearly understood that this description is made only by way of example and not as a limitation to the scope of my invention as set forth in the objects thereof and in the accompanying claims.

I claim:

1. A differential modulator comprising a source of modulating signals, a pulse position modulator coupled to the output of said source to produce position modulated pulses, a short-circuited delay line having a predetermined delay time, means coupling the sending end of said delay line to the output of said modulator to apply thereto said position modulated pulses, means coupled to the sending end of said delay line to remove therefrom a resultant pulse signal having as components thereof the position modulated pulse incident on the sending end of said delay line and the reflected component of the preceding position modulated pulse received at the sending end of said delay line, and means to remove from said resultant pulse signal differential modulation.

2. A differential modulator comprising a source of modulating signals, a pulse position modulator coupled to the output of said source to produce position modulated pulses, a short-circuited delay line having a predetermined delay time, means coupling the sending end of said delay line to the output of said modulator to apply thereto said position modulated pulses, means coupled to the sending end of said delay line to remove therefrom a resultant pulse signal having as components thereof the position modulated pulse incident on the sending end of said delay line and the reflected component of the preceding position modulated pulse received at the sending end of said delay line, said resultant pulse signal including as a component thereof differential modulation and means to remove from said resultant pulse signal said differential modulation.

3. A differential modulator comprising a source of modulating signals, a pulse position modulator coupled to the output of said source to produce position modulated pulses, a short-circuited delay line having a predetermined delay time, means coupling the sending end of said delay line to the output of said modulator to apply thereto said position modulated pulses, means coupled to the sending end of said delay line to remove therefrom a resultant pulse signal having as components thereof the position modulated pulse incident on the sending end of said delay line and the reflected component of the preceding modulated pulse received at the sending end of said delay line, said resultant pulse signal including desired differential modulation and an undesired modulation in time spaced relationship, and means to remove from said resultant pulse signal said differential modulation.

4. A differential modulator comprising a source of modulating signals, a pulse position modulator coupled to the output of said source to produce position modulated pulses having a width corresponding to the maximum possible deviation of the produced pulses, a short-circuited delay line having a predetermined delay time, means coupling the sending end of said delay line to the output of said modulator to apply thereto said position modulated pulses, means coupled to the sending end of said delay line to remove therefrom a resultant pulse signal having as components thereof the position modulated pulse incident on the sending end of said delay line and the reflected component of the preceding modulated pulse received at the sending end of said delay line, and means to remove from said resultant pulse signal differential modulation.

5. A differential modulator comprising a source of modulating signals, a pulse position modulator coupled to the output of said source to produce position modulated pulses having a given repetition frequency, a short-circuited delay line having a time delay related to said given repetition frequency, means coupling the sending end of said delay line to the output of said modulator to apply thereto said position modulated pulses, means coupled to the sending end of said delay line to remove therefrom a resultant pulse signal having as components thereof the position modulated pulse incident on the sending end of said delay line and the reflected component of the preceding position modulated pulse received at the sending end of said delay line, and means to remove from said resultant pulse signal differential modulation.

6. A differential modulator comprising a source of modulating signals, a pulse position modulator coupled to the output of said source to produce position modulated pulses having a given repetition frequency, a short-circuited delay line having a delay time equal to one half said given repetition frequency, means coupling the sending end of said delay line to the output of said modulator to apply thereto said position modulated pulses, means coupled to the sending end of said delay line to remove therefrom a resultant pulse signal having as components thereof the position modulated pulse incident on the sending end of said delay line and the reflected component of the preceding position modulated pulse received at the sending end of said delay line, and means to remove from said resultant pulse signal differential modulation.

7. A differential modulator comprising a source of modulating signals, a pulse position modulator coupled to the output of said source to produce position modulated pulses, the width of said position modulated pulses being equal to the maximum deviation of said position modulated pulses, said position modulated pulses having a given repetition frequency, a short-circuited delay line having a delay time equal to one half said given repetition frequency, means coupling the sending end of said delay line to the output of said modulator to apply thereto said position modulated pulses, means coupled to the sending end of said delay line to remove therefrom a resultant pulse signal having as components thereof the position modulated pulse incident on the sending end of said delay line and the reflected component of the preceding position modulated pulse received at the sending end of said delay line, and means to remove from said resultant pulse signal differential modulation.

References Cited in the file of this patent

UNITED STATES PATENTS 2,662,118 Shouten et al. ____________ Dec. 8, 1953